(12) United States Patent
Kaltenecker et al.

(10) Patent No.: US 6,816,277 B2
(45) Date of Patent: Nov. 9, 2004

(54) SYSTEMS AND METHODS FOR CONVERTING IMAGE DATA

(75) Inventors: Doug Kaltenecker, Meridian, ID (US); Carl Staelin, Haifa (IL); Ryan Kunz, Bountiful, UT (US); Virgil Kay Russon, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 306 days.

(21) Appl. No.: 09/943,623

(22) Filed: Aug. 30, 2001

(65) Prior Publication Data

US 2003/0043397 A1 Mar. 6, 2003

(51) Int. Cl.[7] .............................................. H04N 1/40
(52) U.S. Cl. ...................... 358/1.15; 707/101; 707/103; 358/443
(58) Field of Search ............................. 358/1.15, 1.2, 358/1.13, 1.18, 426.02, 426.03, 448, 443, 474; 707/104.1, 103; 709/722, 723, 315; 799/151

(56) References Cited

U.S. PATENT DOCUMENTS 5,907,835 A * 5/1999 Yokomizo ...................... 707/1
6,567,180 B1 * 5/2003 Kageyama .................. 358/1.15
2002/0001295 A1 * 1/2002 Park ............................ 370/338
2002/0054351 A1 * 5/2002 Kageyama .................. 358/1.18
2002/0116416 A1 * 8/2002 Tesch ......................... 707/516

\* cited by examiner

Primary Examiner—Jerome Grant, II

(57) ABSTRACT

Image processing systems for converting image data corresponding to a document, where the image data exhibits a first format, are disclosed. In this regard, a representative image processing system includes a file conversion system configured to receive information corresponding to the image data as well as information corresponding to a second format to which the image data is to be converted. Additionally, the file conversion system is configured to retrieve information corresponding to a set of format rules, where the set of format rules corresponds to the second format. Thereafter, the file conversion system converts the image data to converted data representative of image data and exhibiting the second format without rescanning, reanalyzing, or reprocessing the document. Methods and other systems also are provided.

35 Claims, 6 Drawing Sheets

SYSTEMS AND METHODS FOR CONVERTING IMAGE DATA

BACKGROUND OF THE INVENTION

1. Field of the Invention

The present invention is generally related to scanning technology and, more particularly, to systems and methods for converting image data that correspond to a document into various file formats. In some embodiments, conversion of the image data is accomplished without re-analyzing the data acquired from the document.

2. Description of the Related Art

Scanner devices, such as flatbed scanners, are well known in the art. These devices produce machine-readable image data signals that are representative of a scanned document, such as a photograph or a page of printed text. In a typical scanner application, the image data signals produced by a scanner may be used by a personal computer to reproduce an image of the scanned document on a suitable display device, such as a monitor or a printer.

A typical flatbed scanner may include illumination and optical systems to accomplish the task of scanning a document. The illumination system illuminates a portion of the document (commonly referred to as a "scan region"). The optical system collects light reflected by the illuminated scan region and focuses a small area of the illuminated scan region (commonly referred to as a "scan line") on the surface of a photosensitive detector positioned within the scanner. Image data representative of the entire document may then be obtained by sweeping the scan line across the entire source document, usually by moving the illumination and optical systems with respect to the document being scanned.

Scanning devices are useful in many applications where it is desirable to transfer an image from printed form into electronic form. Scanners capable of reading and converting a document into electronic format have been available for quite some time. Typically, a scanner will electronically read a document, classify the different types of images on the document, and electronically store the information for later presentation and use. The types of classifications of a scanned document typically include text, photographs, drawings, charts, tables, business graphics, equations, handwriting, logos, etc. These different parts of the scanned image can be classified into regions. For example, in a document including text and drawings, a scanner can scan the document and classify and store the text information as a text region and classify and store the drawing information as a drawing region.

Generally, when a document is scanned, the scanned image is saved into the memory of the scanner, such as memory in a scanner, computer, processor-based device, etc. in a particular file format, such as a PDF file format. The scanning process produces a raster-scanned image (hereinafter scanned image). The scanned image is typically not in a format that is directly usable by many applications. In order to convert the scanned image into a usable format, the scanned image is typically analyzed by an image analysis system (e.g., page and region analysis system). Generally, the image analysis system decomposes the page into region (e.g., character and image regions), and the resulting regions are processed depending upon the type of region. For example, the image regions can be enhanced, while the character regions are processed using an optical character recognition process. Image analysis systems that include page analysis and region processing techniques are well known in the art.

Generally, the process of scanning, analyzing, and processing is problematic for at least two reasons. One problem is that if a document is to be used for multiple purposes the document must be retained and rescanned because once the scanned image has been processed into one format, pertinent information that may be needed for a different format may be lost. Therefore, the scanned image of one format cannot typically be reformatted to a different format because there may not be sufficient information to describe the scanned image in the different format.

Another problem is that the time consuming operations of scanning, analysis, and processing operations of the scanned image, such as optical character recognition, need to be performed independently for each format, thereby, expending valuable resources. used by multiple different formats, and thus need only to be performed once Despite the problems identified above, rescanning, reanalysis and reprocessing of previously analyzed scanned images is typically conducted to convert the scanned image saved in a file of a particular file format into another file format. For instance, a user may want to convert the scanned image file into another file format so the scanned image can be manipulated using programs capable of reading the new file format of the scanned image.

SUMMARY OF THE INVENTION

Briefly described, the present invention provides image processing systems for converting image data corresponding to a document, where the image data exhibits a first format. In this regard, the image processing system includes a file conversion system configured to receive information corresponding to the image data. In addition, the file conversion system is configured to receive information corresponding to a second format to which the image data is to be converted. Further, the file conversion system is configured to retrieve information corresponding to a set of format rules, where the set of format rules corresponds to the second format. Still further, the file conversion system is configured to convert the image data to converted data representative of the image data and exhibiting the second format without, rescanning, reanalyzing, or reprocessing the document.

The present invention also involves a system for converting image data corresponding to a document, where the image data exhibits a first format. The method comprises: receiving information corresponding to the image data; receiving information corresponding to a second format to which the image data is to be converted; retrieving information corresponding to a set of format rules, the set of format rules corresponding to the second format; and converting the image data to converted data representative of the image data and exhibiting the second format without rescanning, reanalyzing, or reprocessing the document.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

Moreover, in the drawings, like reference numerals designate corresponding parts throughout the several views.

DETAILED DESCRIPTION

Image processing systems of the present invention potentially eliminate the need to rescan, reanalyze, and reprocess image data corresponding to a document, for example, when the image data is to be converted from one file format to another. This can enable image data to be more accurately and efficiently converted into various file formats. In some embodiments, this is accomplished by producing a structured file from the image data, which file contains sufficient information for rendering the data into one of a number of formats. Then converting the structured file into converted data representative of the image data and able to exhibit various selected file formats.

Figure 1:
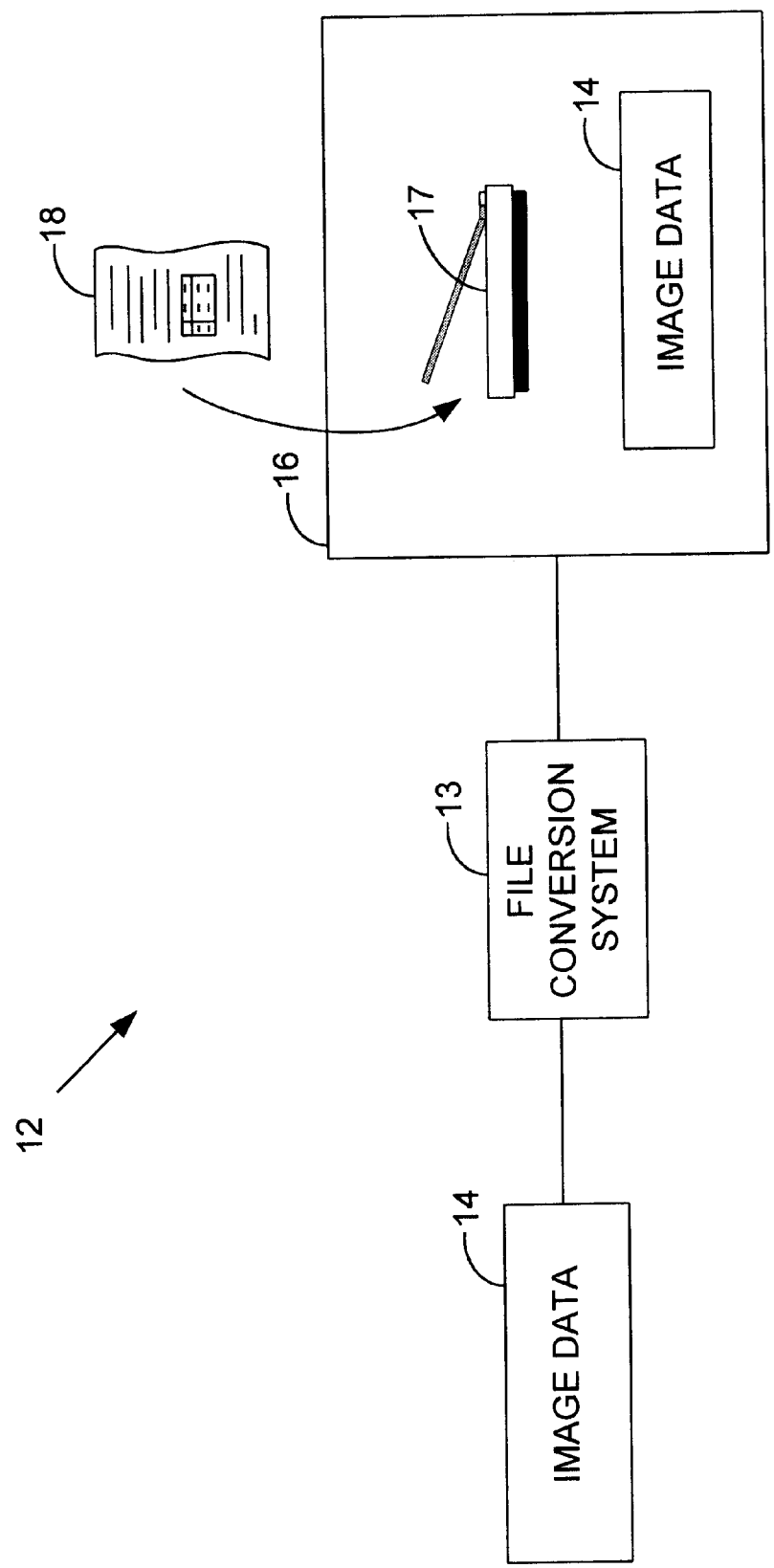
FIG. 1 is a schematic diagram illustrating a representative embodiment of the image processing system of the present invention.

Turning now to the drawings, wherein like reference numerals designate corresponding parts throughout the views, FIG. 1 illustrates a representative embodiment of an image processing system 12. As shown in FIG. 1, image processing system 12 includes a file conversion system 13. The file conversion system 13 is adapted to receive image data, such as image data 14, which can correspond to a document or any other source that is capable of providing image data. A document can include, for example, a physical document or an electronic document. Image data include, for example, data related to physical and/or electronic features such as, images, text, line art and other features that can be included on a document. As will be described later, the file conversion system 13 facilitates conversion of the image data 14, such as from one file format to another.

In some embodiments, image data 14 can be provided to the file conversion system 13 by an image-capturing system 16. In FIG. 1, a direct line (not shown) can be used to communicate image data 14 to the file conversion system 13. In other embodiments, however, such an image-capturing system 16 is communicatively coupled to the file conversion system 13 via a network 15, as shown in FIG. .

Image-capturing system 16 of FIG. 1 includes an image-capturing device 17, e.g., a scanner, digital camera, digital video camera/recorder, that is adapted to acquire image data, e.g., image data 14 corresponding to a physical or electronic document. For instance, a physical document 18 can be scanned by image-capturing device 17, with image data 14 corresponding to the document 18 being converted into an image data file. Such an image data file then can be communicated to the file conversion system 13 for processing.

Figure 2:
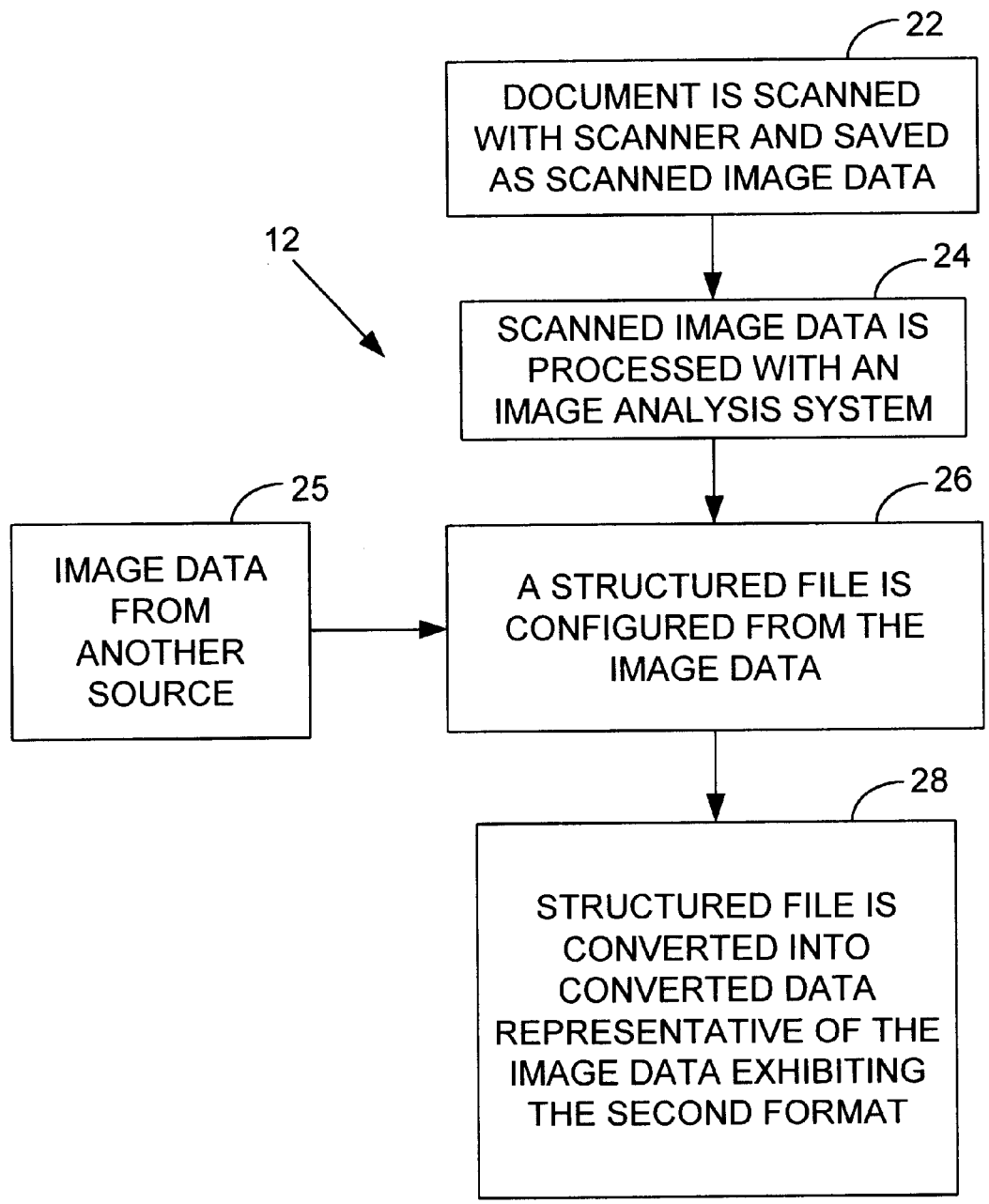
FIG. 2 is a flow diagram illustrating a representative scanning process that can be used in connection with FIG. 1.

As shown in FIG. 2, a document 18 can be scanned using a scanner, and scanned image data 14 corresponding to the document 18 can be stored in memory as a scanned image data (block 22). The scanned image then can be processed using an image analysis system to produce an image data, as shown in block 24.

As shown in block 25, image data can be obtained by methods other than scanning. For example, previously acquired image data (e.g. electronic document) could be provided by a storage device, such as an external hard drive.

Regardless of the particular manner used to acquire the image data, a structured file containing sufficient information for converting to various format can be configured from the image data (block 26). Subsequently, the structured file can be converted into converted data representative of the image data and exhibiting one of a number of formats (block 28). Preferably, the functionality generally described in relation to block 22–28 is implemented by an image processing system, such as the image processing system 12 of FIG. 1. In particular, the functionality described in FIG. 1 can be implemented by a file conversion system 13.

Figure 3:
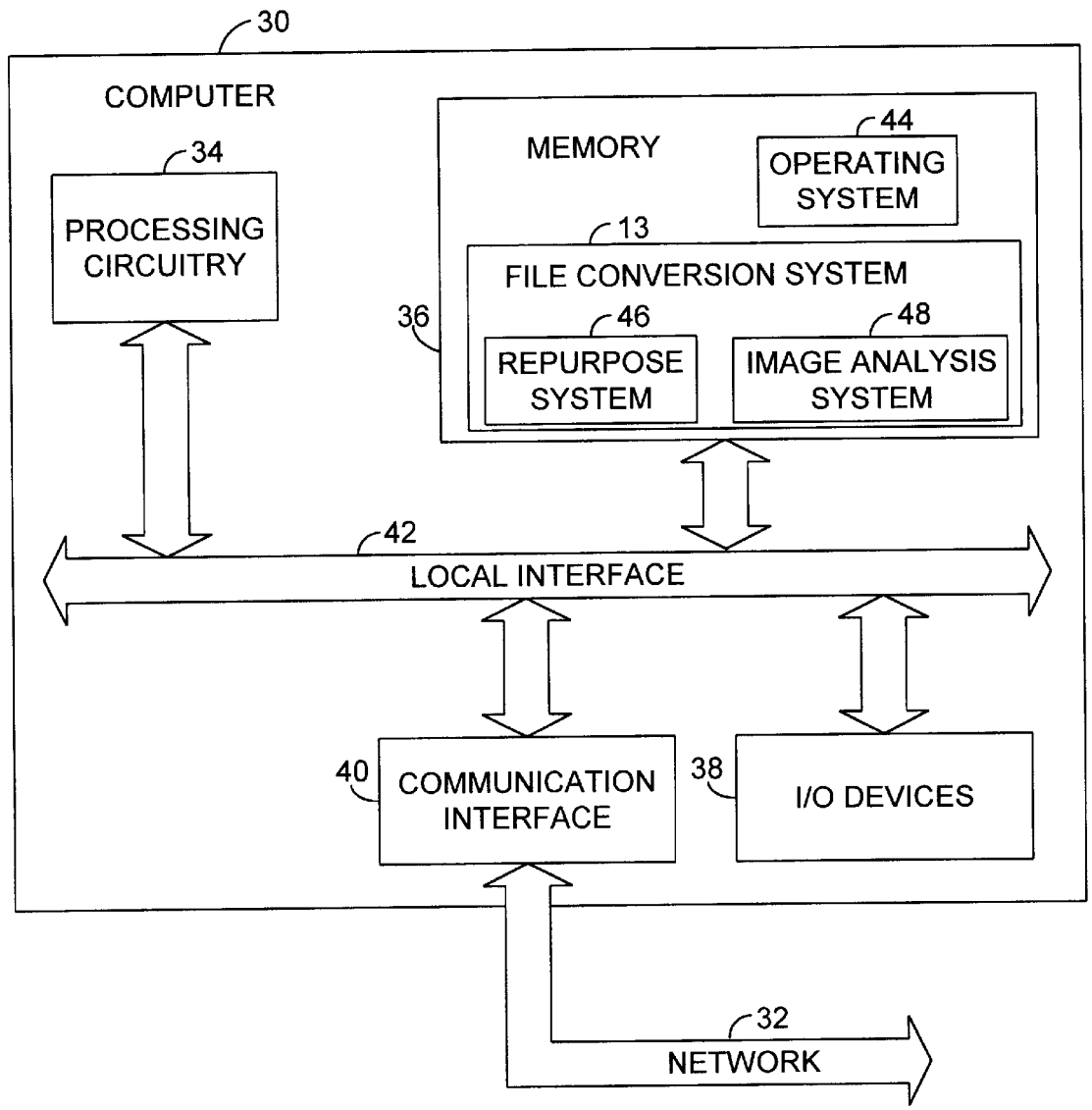
FIG. 3 is a flow diagram illustrating a representative analysis process of the scanned image referred to in FIG. 2.

File conversion systems 13 of the present invention can be implemented in software, firmware, hardware, or a combination thereof. Preferably, the file conversion system 13 is implemented in software as an executable program that can be executed by a special or general purpose digital computer, such as a personal computer, workstation, minicomputer, or mainframe computer. An example of a representative computer or processor-based system that can implement the file conversion system 13 is shown in FIG. 3.

Generally, in terms of hardware architecture, computer 30 includes a processor 34, memory 36, and one or more input and/or output (I/O) devices 58 (or peripherals) that are communicatively coupled via a local interface 42. The local interface 42 can be, for example but not limited to, one or more buses or other wired or wireless connections, as is known in the art. The local interface 42 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The computer 30 can be communicatively coupled to other computers, servers, etc. via a network 32. Network 32 can be one or more networks capable of enabling the above components to communicate and include, for example, a local area network (LAN), a wireless local area network (WLAN), a metropolitan area network (MAN), a wide area network (WAN), any public or private packet-switched or other data network, including the Internet, circuit-switched networks, such as the public switched telephone network (PSTN), wireless networks, or any other desired communications infrastructure.

The processor 34 can be a hardware device for executing software, particularly that stored in memory 36. The processor 34 can be any custom made or commercially available processor, a central processing unit (CPU), an auxiliary processor among several processors associated with the computer 30, a semiconductor based microprocessor (in the form of a microchip or chip set), a macroprocessor, or generally any device for executing software instructions.

The memory 36 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 36 may incorporate electronic, magnetic, optical, and/or other types of storage media. Note that the memory 36 can have a distributed architecture, where various components are situated remote from one another, but can be accessed by the processor 34. The software in memory 36 may include one or more separate programs, each of which comprises an ordered listing of executable instructions for implementing logical functions. In the example of FIG. 3, the software in the memory 36 includes the file conversion system 13 and a suitable operating system (O/S) 44. The operating system 44 essentially controls the execution of other computer programs, such as the file conversion system 13, and provides scheduling, input-output control, file and data management, memory management, and communication control and related services.

The file conversion system 13 can be a source program, executable program (object code), script, or any other entity comprising a set of instructions to be performed. When a source program, then the program needs to be translated via a compiler, assembler, interpreter, or the like, which may or may not be included within the memory 36, so as to operate properly in connection with the O/S 44. Furthermore, the file conversion system 13 can be written as (a) an object oriented programming language, which has classes of data and methods, or (b) a procedure programming language, which has routines, subroutines, and/or functions, for example, but not limited to, C, C++, Pascal, Basic, Fortran, Cobol, Perl, Java, and Ada.

The I/O devices 38 may include input devices, for example but not limited to, a keyboard, mouse, etc. Furthermore, the I/O devices 38 may also include output devices, for example but not limited to, a printer, display, etc. Finally, the I/O devices 38 may further include devices that communicate both inputs and outputs, for instance but not limited to, a modulator/demodulator (modem; for accessing another device, system, or network), a radio frequency (RF) or other transceiver, a telephonic interface, etc.

If the computer is a PC, workstation, or the like, the software in the memory 36 may further include a basic input output system (BIOS) (omitted for simplicity). The BIOS is a set of essential software routines that initialize and test hardware at startup, start the O/S 44, and support the transfer of data among the hardware devices. The BIOS is stored in ROM so that the BIOS can be executed when the computer is activated.

When the computer 30 is in operation, the processor 34 is configured to execute software stored within the memory 36, to communicate data to and from the memory 36, and to generally control operations of the computer 30 pursuant to the software. The file conversion system 13 and the O/S 44, in whole or in part, but typically the latter, are read by the processor 34, perhaps buffered within the processor 34, and then executed.

When the file conversion system 13 is implemented in software, as is shown in FIG. 3, it should be noted that the file conversion system 13 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The file conversion system 13 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the file conversion system 13 is implemented in hardware, the file conversion system 13 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As depicted in FIG. 3, the file conversion system 13 can include a repurpose system 46 and an image analysis system 48. Typically, repurpose system 46 and image analysis system 48 are stored in the memory 36 of the computer. In other embodiments, however, the repurpose system 46 and image analysis system 48 can be stored at different locations and/or be associated with different devices. For example, the image analysis system 48 may be associated with a scanner 17, whereas the repurpose system 46 could be associated with a personal computer.

Figure 4:
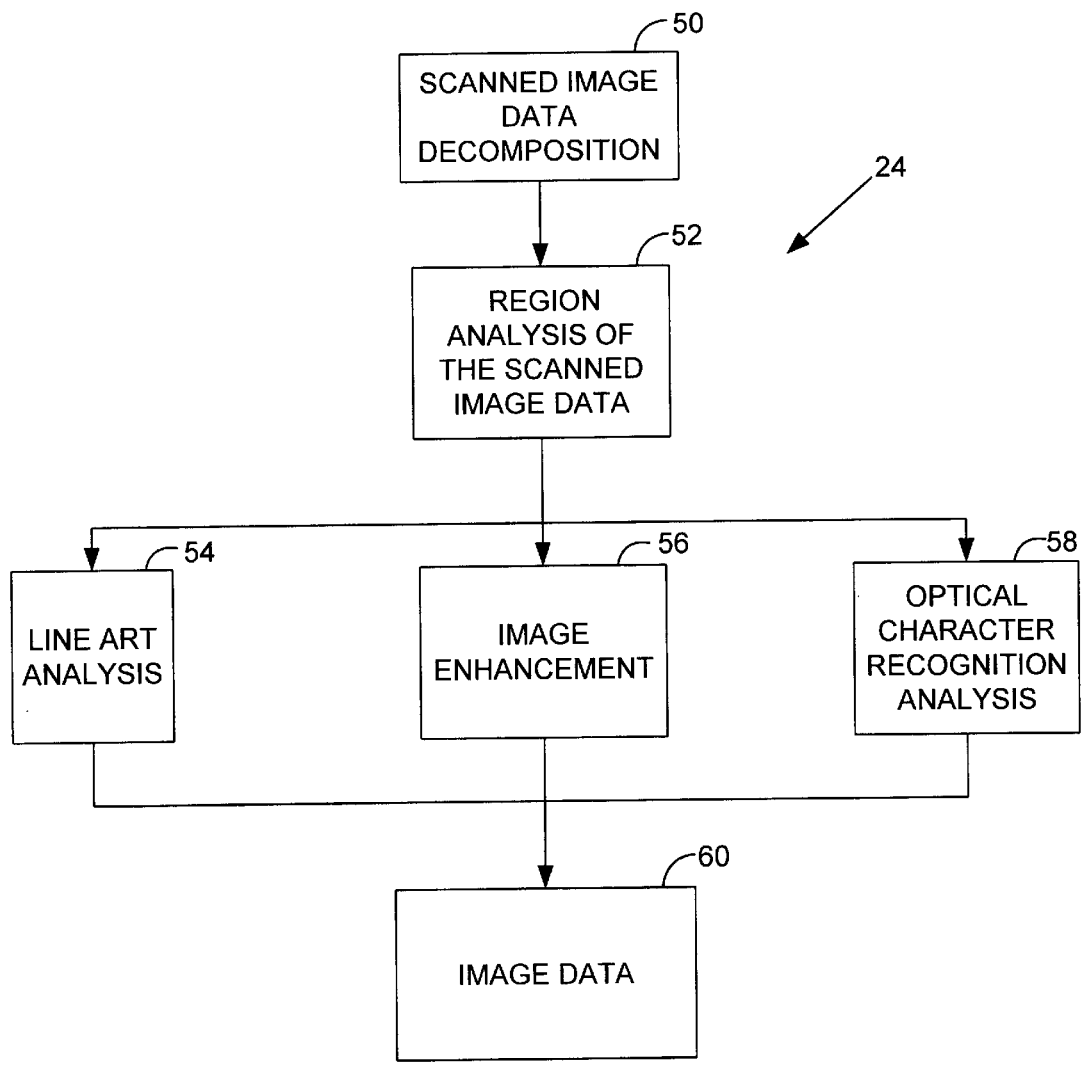
FIG. 4 is a schematic diagram of a representative computer or processor-based system that can be used to implement the file conversion system of FIG. 1.

Reference will now be made to the flowchart of FIG. 4, which depicts functionality of a representative embodiment of image analysis system 48. In this regard, each block of the flowchart represents a module segment, portion of code or logic circuit(s) for implementing the specified logical function(s). It should also be noted that in some alternative implementations the functions noted in various blocks of FIG. 4, or any other of the accompanying flowcharts, may occur out of the order in which they are depicted. For example, two blocks shown in succession in FIG. 4 may, in fact, be executed substantially concurrently. In other embodiments, the blocks may sometimes be executed in the reverse order depending upon the functionality involved.

Reference will now be made to the flowchart of FIG. 4, which is a flow diagram that illustrates a representative image analysis system 48. Note, image analysis processes systems (or processes) are well known in the art and one skilled in this art would understand that other image analysis systems with various other options can be used in conjunction with embodiments of the file conversion system. The image analysis system 48 is an exemplary system for performing the functions described in FIG. 4 and as such is capable of decomposing acquired scanned image data, as shown in block 30. For example, text, image, and line art can be decomposed into separate regions. The separate regions then can be analyzed using separate analyses, as shown in blocks 54, 56, and 58. For example, the image analysis system 48 can separately analyze the image and line art regions. More particularly, the image and line art regions can be enhanced using known techniques, and the text regions can be analyzed using well-known optical character recognition analysis processes. In addition, the image analysis system 48 may analyze a region using a plurality of analyses. After appropriate analysis of the regions, the analyzed regions can be used to produce an image data that may have been enhanced and/or corrected for imaging related errors, as shown in block 60.

As mentioned above, the file conversion system 13 of the present invention can be used to convert image data from one file format to another. In this regard, the file conversion system 13 converts image data to information corresponding to a structured file. A structured file can be a multivalent document file, which is essentially a file system within a file. Typically, such a structured file includes information corresponding to image(s) and text in a single, searchable document file that contains sufficient information to facilitate conversion to a plurality of formats. More specifically, a structured file includes object groups associated with features (e.g, text and/or image regions) of the image corresponding to the image data file. Object groups can include, for example, text, line art, images, tables, etc. Images can include, for example, color drawings, graphics, charts, and photographs. A structured file also can include other information, such as the coordinate location of associated object groups and a copy of a corresponding image data file (before and/or after analysis). So configured, a structured file can be searched for specific information, such as a particular type of object group. As indicated above, the structured file contains a superset of information sufficient to facilitate format conversion into any one of a number of various formats herein noted, without rescanning or reprocessing, yet all of the information may not be required for any single format conversion.

Preferably, the file conversion system 13 also includes and/or has access to information corresponding to one or more sets of file format rules, each of which corresponds to a particular file format. Generally, the file format rules represent functionality tailored to convert the information corresponding to the structured file to converted data representative of the image data and exhibiting one of a number of formats. The file conversion system 13 is capable of applying a particular set of these file format rules to the appropriate information corresponding to the structured file. Thus, the file conversion system 13 can apply specific format file rules to the appropriate information corresponding to specific object groups of the structured file.

Figure 5:
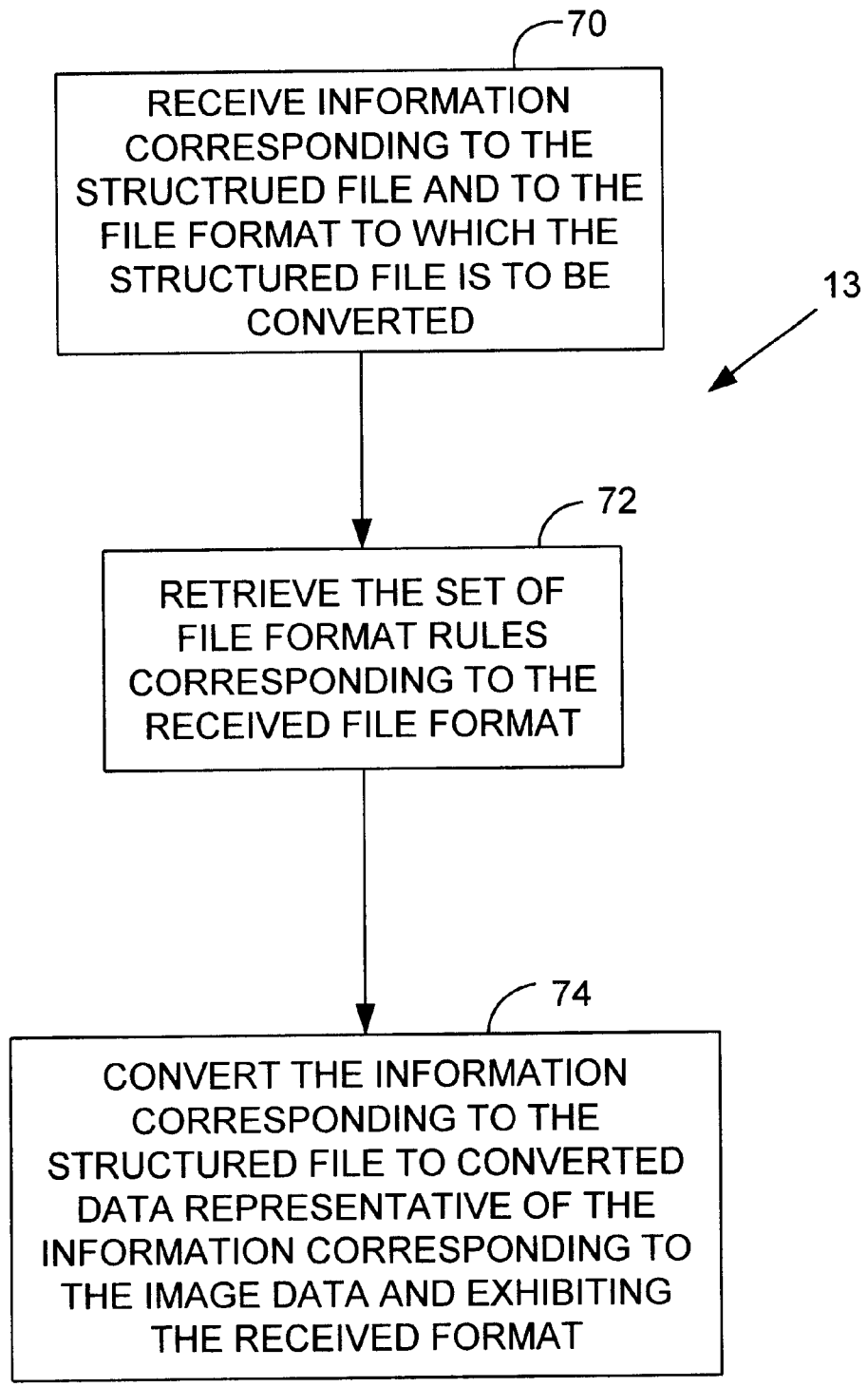
FIG. 5 is a flow diagram illustrating representative functionality of an embodiment of the repurpose system referred to in FIG. 4.

The file conversion system 13 is an exemplary system for performing the functions described in FIG. 5. As depicted in FIG. 5, the file conversion system 13 is capable of receiving information corresponding to the structured file and information corresponding to a file format to which to the information corresponding to the structured file is to be converted, as shown in block 70. For example, the file formats may include, for example, FPX, GIF, JPEG, TIFF, TIFF (compressed), TIFF (multipage), BMP, PCX, PNG, HTML, laserjet 1100 self viewer *.exe, PDF, RTF, TXT, WMF, etc. Each file format has a corresponding set of file format rules from which the file conversion system 13 can select and use to convert the information corresponding to the object groups into information corresponding to the modified object groups. Upon receiving information corresponding to a file format, the file conversion system 13 retrieves, such as from memory, the set of file format rules that corresponds to the received file format, as shown in block 72. Thereafter, the information corresponding to the structured file is converted to converted data representative of the information corresponding to the image data and exhibiting the received format, as shown in block 74.

Figure 6:
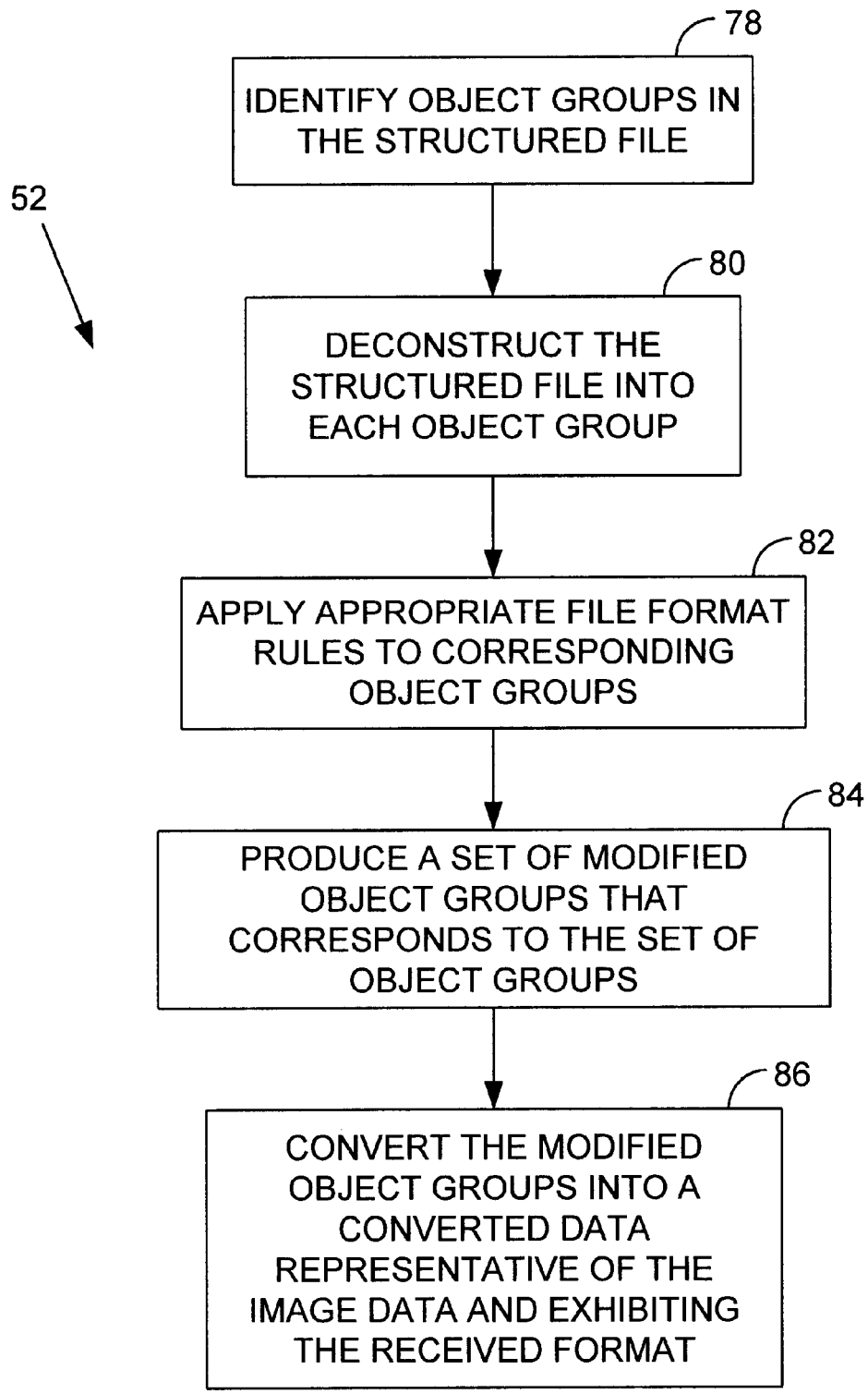
FIG. 6 is a flow diagram illustrating alternative functionality of an embodiment of the repurpose system referred to in FIGS. 4 and 5.

FIG. 6 is a flow diagram that illustrates representative functionality of an embodiment of the repurpose system 52, which generally related to block 74 of FIG. 5. As shown in FIG. 6, repurpose system 52 is an exemplary system for performing the functions described in reference to FIG. 6 and as such is capable of identifying the object groups included in the structured file (block 78). In block 80, the repurpose system 52 is capable of deconstructing the structured file into each object group. Deconstruction of the structured file may include searching and sequestering specific information corresponding to the structured file, such as particular object groups. The repurpose system 52 is capable of applying the appropriate set of file format rules to the information corresponding to the object groups, as shown in block 82. In this regard, the repurpose system 52 is capable of applying a particular type of file format rule applicable to the information corresponding to the each type of object group. Applying the set of file format rules to the information corresponding to the set of object groups produces information corresponding to a set of modified object groups, as shown in block 84. Thereafter, the repurpose system 52 is capable of converting the set of modified object groups to converted data representative of the image data and exhibiting the received format, as shown in block 86.

As the above discussion illustrates, embodiments of the file conversion system 13 facilitate the production of converted data representative of image data and exhibiting the received format. This potentially eliminates the need to analyze and process an image data file more than once. As discussed above, these are time and resource consuming processes. In addition, eliminating the need to analyze an image data multiple times can accelerate the file format conversion process.

Many variations and modifications may be made to the above-described embodiment(s) of the invention without departing substantially from the spirit and principles of the invention.

For instance, it should be noted that the file conversion system 13 or a component thereof, such as the image analysis system 24, could be implemented by an image-capturing system 16, digital cameras, digital video cameras/recorder, etc. In addition, the file conversion system 13 or components thereof can include additional features such as, for example, enabling the operator control to correct errors resulting from the image analysis or file creation (e.g. structured file). All such modifications and variations are intended to be included herein within the scope of this disclosure and the present invention and protected by the following claims.

We claim the following:

1. A method for use in a computer system for converting image data corresponding to a document, the image data being configured in a first format, said method comprising:

receiving information corresponding to the image data, wherein the image data is configured as an image data file, and wherein the information corresponding to the image data file is a structured file including at least one object group;

receiving information corresponding to a second format to which the image data is to be converted;

retrieving information corresponding to a set of format rules, the set of format rules corresponding to the second format; and converting the image data according to the format rules to converted data representative of the image data and exhibiting the second format without rescanning, reanalyzing or reprocessing the document, wherein converting includes:

identifying the information corresponding to each object group of the structured file, applying the set of format rules to the information corresponding to each identified object group of the structured file, producing a set of modified object groups corresponding to the identified object groups of the structured file, and converting the information corresponding to the set of modified object groups to converted data representative of the image data and exhibiting the second format.

2. The method of claim 1, wherein identifying each object group of the structured file includes deconstructing the information corresponding to the structured file into information corresponding to the object groups.

3. The method of claim 1, further comprising:
acquiring the image data corresponding to the document.

4. The method of claim 3, further comprising:
convening the image data into an image data file.

5. The method of claim 3, wherein acquiring the image data corresponding to the document, comprises:
scanning the document to generate scanned data; and
processing the scanned data to generate image data.

6. The method of claim 1, further comprising:
producing a structured file corresponding to the image data, the structured file including information corresponding to each of the at least one object groups associated with the image data; and
wherein receiving information corresponding to the image data comprises:
receiving information corresponding to the structured file.

7. The method of claim 1, wherein the second format includes TIFF, FPX, GIF, JPEG, BMP, PCX, PNG, HTML, PDF, RTF, TXT, and WMF.

8. An image processing system for converting image data corresponding to a document, the image data exhibiting a first format, said image processing system comprising:
a file conversion system configured to:
receive information corresponding to the image data, wherein the image data is configured as an image data file, wherein the information corresponding to the image data file is a structured file including information corresponding to each of the at least one object groups;
receive information corresponding to a second format to which the image data is to be converted;
retrieve information corresponding to a set of format rules, the set of format rules corresponding to the second format;
convert the image data to converted data representative of the image data and exhibiting the second file format by being configured to identify the information corresponding to each object group of the structured file;

apply the set of format rules to the information corresponding to each identified object group of the structured file;

convert the image data to converted data representative of the image data and exhibiting the second format by being configured to produce a set of modified object groups corresponding to identified object groups of the structured file; and convert the information corresponding to each set of modified object groups to converted data representative of the image data and exhibiting the second format without rescanning, reanalyzing or reprocessing the document.

9. The image processing system of claim 8, wherein the file conversion system is configured to acquire the image data corresponding to the document.

10. The image processing system of claim 9, wherein the file conversion system is configured to convert the image data into an image data file.

11. The image processing system of claim 8, further including logic configured to identify information corresponding to each of the object groups in the structured file.

12. The image processing system of claim 8, further including means for retrieving a set of format rules corresponding to the first format.

13. The image processing system of claim 8, further comprising:
an image-capturing system communicating with said file conversion system, said image-capturing system being configured to acquire the image data corresponding to the document and provide the image data to said file conversion system.

14. The image processing system of claim 13, wherein said image-capturing system includes a scanner.

15. A computer readable medium for converting image data corresponding to a document, the image data being configured in a first format, said computer readable medium comprising:
logic configured to enable information corresponding to the image data to be received, wherein the image data is configured as an image data file, and wherein the information corresponding to the image data file is a structured file including at least one object group;
logic configured to enable information corresponding to a second format to which the image data is to be converted to be received;
logic configured to enable information corresponding to a set of format rules to be retrieved, the set of format rules corresponding to the second format;
logic configured to enable the information corresponding to each object group of the structured file to be identified;
logic configured to enable the set of format rules to be applied to the information corresponding to the each identified object group of the structured file;
logic configured to enable a set of modified object groups corresponding to the identified object groups of the structured file to be produced; and
logic configured to enable the information corresponding to the set of modified object groups to be converted to converted data representative of the image data and exhibiting the second format without rescanning, reanalyzing or reprocessing the document.

16. The computer readable medium of claim 15, wherein the logic configured to enable each object group of the structured file to be identified includes logic configured to enable the information corresponding to the structured file into information corresponding to the object groups to be deconstructed.

17. The computer readable medium of claim 15, further comprising:
   logic configured to enable the image data corresponding to the document to be acquired.

18. The computer readable medium of claim 17, further comprising:
   logic configured to enable the image data to be converted into an image data file.

19. The computer readable medium of claim 17, wherein the logic configured to enable the image data corresponding to the document to be acquired, comprises:
   logic configured enable scanned data to be acquired from the document; and
   logic configured to enable the scanned data to be processed to generate image data.

20. The computer readable medium of claim 15, further comprising:
   logic configured to enable a structured file corresponding to the image data to be produced, the structured file including information corresponding to each of the at least one object groups associated with the image data; and
   wherein logic configured to enable information corresponding to the image data to be received comprises:
   logic configured to enable information corresponding to the structured file to be received.

21. The computer readable medium of claim 15, wherein the second format includes TIFF, FPX, GIF, JPEG, BMP, PCX, PNG, HTML, PDF, RTF, TXT, and WMF.

22. A method for use in a computer system for converting image data corresponding to a document, the image data being configured in a first format, said method comprising:
   receiving information corresponding to the image data, wherein the image data is configured as an image data file, and wherein the information corresponding to the image data file is a structured file including at least one object group;
   receiving information corresponding to a second format to which the image data is to be converted;
   retrieving information corresponding to a set of format rules, the set of format rules corresponding to the second format; and
   converting the image data according to the format rules to converted data representative of the image data and exhibiting the second format without rescanning, reanalyzing or reprocessing the document, wherein converting includes producing a set of modified object groups corresponding to the identified object groups of the structured file.

23. The method of claim 22, further comprising:
   converting the information corresponding to the set of modified object groups to converted data representative of the image data and exhibiting the second format.

24. A method for use in a computer system for converting image data corresponding to a document, the image data being configured in a first format, said method comprising:
   receiving information corresponding to the image data, wherein the image data is configured as an image data file, and wherein the information corresponding to the image data file is a structured file including at least one object group;
   receiving information corresponding to a second format to which the image data is to be converted;
   retrieving information corresponding to a set of format rules, the set of format rules corresponding to the second format; and
   converting the image data according to the format rules to converted data representative of the image data and exhibiting the second format without rescanning, reanalyzing or reprocessing the document, wherein converting includes:
   applying a set of format rules to the information corresponding to the each identified object group of the structured file, and
   producing a set of modified object groups corresponding to the identified object groups of the structured file.

25. A method for use in a computer system for converting image data corresponding to a document, the image data being configured in a first format, said method comprising:
   receiving information corresponding to the image data, wherein the image data is configured as an image data file, and wherein the information corresponding to the image data file is a structured file including at least one object group;
   receiving information corresponding to a second format to which the image data is to be converted;
   retrieving information corresponding to a set of format rules, the set of format rules corresponding to the second format; and
   converting the image data according to the format rules to converted data representative of the image data and exhibiting the second format, wherein converting includes:
   identifying the information corresponding to each object group of the structured file,
   applying the set of format rules to the information corresponding to the each identified object group of the structured file,
   producing a set of modified object groups corresponding to the identified object groups of the structured file, and
   converting the information corresponding to the set of modified object groups to converted data representative of the image data and exhibiting the second format.

26. An image processing system for converting image data corresponding to a document, the image data exhibiting a first format, said image processing system comprising:
   a file conversion system configured to:
   receive information corresponding to the image data, wherein the image data is configured as an image data file, wherein the information corresponding to the image data file is a structured file including information corresponding to each of the at least one object groups;
   receive information corresponding to a second format to which the image data is to be convened;
   retrieve information corresponding to a set of format rules, the set of format rules corresponding to the second format;
   convert the image data to converted data representative of the image data and exhibiting the second format by being configured to produce a set of modified object groups corresponding to identified object groups of the structured file; and
   convert the information corresponding to each set of modified object groups to converted data representative of the image data and exhibiting the second format without rescanning, reanalyzing or reprocessing the document.

27. The image processing system if claim 26, wherein the file conversion system configured to apply the set of format rules to the information corresponding to each identified object group of the structured file.

28. The image processing system of claim 26, further comprising:
an image-capturing system communicating with said file conversion system, said image-capturing system being configured to acquire the image data corresponding to the document and provide the image data to said file conversion system.

29. The image processing system of claim 26, wherein said image-capturing system includes a scanner.

30. An image processing system for converting image data corresponding to a document, the image data exhibiting a first format, said image processing system comprising:
a file conversion system configured to:
receive information corresponding to the image data, wherein the image data is configured as an image data file, wherein the information corresponding to the image data file is a structured file including information corresponding to each of the at least one object groups;
receive information corresponding to a second format to which the image data is to be converted;
retrieve information corresponding to a set of format rules, the set of format rules corresponding to the second format;
convert the image data to converted data representative of the image data and exhibiting the second file format by being configured to identify the information corresponding to each object group of the structured file;
apply the set of format rules to the information corresponding to each identified object group of the structured file;
convert the image data to converted data representative of the image data and exhibiting the second format by being configured to produce a set of modified object groups corresponding to identified object groups of the structured file; and
convert the information corresponding to each set of modified object groups to converted data representative of the image data and exhibiting the second format.

31. The image processing system of claim 30, further comprising:
an image-capturing system communicating with said file conversion system, said image-capturing system being configured to acquire the image data corresponding to the document and provide the image data to said file conversion system.

32. The image processing system of claim 30, wherein said image-capturing system includes a scanner.

33. A computer readable medium for converting image data corresponding to a document, the image data being configured in a first format, said computer readable medium comprising:
logic configured to enable information corresponding to the image data to be received, wherein the image data is configured as an image data file, and wherein the information corresponding to the image data file is a structured file including at least one object group;
logic configured to enable information corresponding to a second format to which the image data is to be converted to be received;
logic configured to enable information corresponding to a set of format rules to be retrieved, the set of format rules corresponding to the second format;
logic configured to enable a set of modified object groups corresponding to the identified object groups of the structured file to be produced; and
logic configured to enable the information corresponding to the set of modified object groups to be converted to convened data representative of the image data and exhibiting the second format without rescanning, reanalyzing or reprocessing the document.

34. The computer readable medium of claim 33, further comprising: logic configured to enable the set of format rules to be applied to the information corresponding to the each identified object group of the structured file.

35. A computer readable medium for converting image data corresponding to a document, the image data being configured in a first format, said computer readable medium comprising:
logic configured to enable information corresponding to the image data to be received, wherein the image data is configured as an image data file, and wherein the information corresponding to the image data file is a structured file including at least one object group;
logic configured to enable information corresponding to a second format to which the image data is to be converted to be received;
logic configured to enable information corresponding to a set of format rules to be retrieved, the set of format rules corresponding to the second format;
logic configured to enable the information corresponding to each object group of the structured file to be identified;
logic configured to enable the set of format rules to be applied to the information corresponding to the each identified object group of the structured file;
logic configured to enable a set of modified object groups corresponding to the identified object groups of the structured file to be produced; and
logic configured to enable the information corresponding to the set of modified object groups to be converted to converted data representative of the image data and exhibiting the second format.

* * * * *